(12) United States Patent
Gershon

(10) Patent No.: US 6,257,984 B1
(45) Date of Patent: Jul. 10, 2001

(54) VIDEO GAME CAP

(76) Inventor: Howard Gershon, 112 W. 34th St., New York, NY (US) 10120

( * ) Notice: Subject to any disclaimer, the term of this patent is extended or adjusted under 35 U.S.C. 154(b) by 0 days.

(21) Appl. No.: 09/407,029

(22) Filed: Sep. 27, 1999

(51) Int. Cl.⁷ ........................................................ A63F 9/22

(52) U.S. Cl. ...................................... 463/48; 273/DIG. 17

(58) Field of Search ..................................... 463/1, 30, 36, 463/48, 46, 47; 345/7–8, 10; 273/459, 460, 461, DIG. 17

(56) References Cited

U.S. PATENT DOCUMENTS

| 3,294,401 | * | 12/1966 | Nicholas | 273/DIG. 17 |
| 4,667,274 | * | 5/1987 | Daniel . | |
| 5,082,291 | * | 1/1992 | Appel | 273/DIG. 17 |

* cited by examiner

Primary Examiner—Mark Sager
(74) Attorney, Agent, or Firm—Myron Amer PC

(57) ABSTRACT

A push button-operated video game mounted in a front display position of a cap, so that in the cap-on position, i.e., when the cap is on the user's head, there is less likelihood of the loss of the video game and, in the cap-off position, the video game is in facing relation to the user to facilitate push button operation of the game.

1 Claim, 1 Drawing Sheet

VIDEO GAME CAP

The present invention relates generally to method improvements for transporting and using a battery-operated portable video game in which, the improvements, more particularly, facilitate the transport of the video game, namely by minimizing possible loss or damage and also facilitate the use of the game, namely by contributing to properly positioning of the video game in relation to the user.

EXAMPLE OF THE PRIOR ART

Already known light displays of content capable of being of interest to a viewer are exemplified by the "Self-Illumination Patch Assembly" of U.S. Pat. No. 4,667,274 issued to Daniel on May 19, 1987. This patent is singled out because the light display has a display position on a beaked cap, namely on the cap front area just above the beak. The '274 cap has novelty value limited to the attention it attracts from passersby.

Broadly, it is an object of the present invention to provide a cap light display overcoming the foregoing and other shortcomings of the prior art.

More particularly, it is an object to improve a cap light display, such as the '274 cap, by the selection of a light display which uses to advantage (1) the use of the cap as a carrier and also (2) the way a cap is used to enhance the interest value of the light display, all as will be better understood as the description proceeds.

Underlying the present invention is the recognition that a light display-bearing cap, and also of course one without such an adornment, has cap-on and cap-off wearing positions, the former the better for presenting a display to passersby and also obviating loss and damage to the display if, for example, it was instead not attached to the cap, and the latter the better for observing and the enjoying of the display by the user, by holding the cap conveniently by its beak and positioning the display thereon in facing relation to the user.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
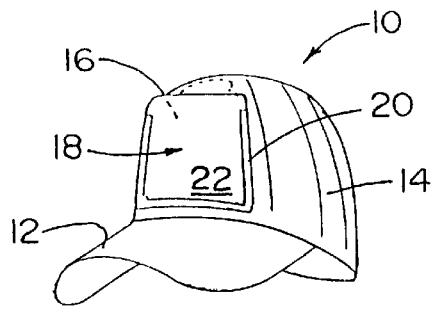
FIG. 1 is a perspective view of a cap having a display thereon in accordance with the practice of the prior art.

Shown in FIG. 1 is a cap, generally designated 10, having a beak 12 and a semi-circular head-conforming shaped cover 14 having a front area 16 which typically holds a display generally designated 18, which consists of a frame 20 and card 22 or the like inserted in the frame. U.S. Pat. No. 4,667,274 for "Self-Illumination Patch Assembly" issued to Daniel on May 19, 1987 exemplifies the cap of FIG. 1.

Underlying the present invention is the recognition that the displayed card or the like 22 can contribute to the novelty value of the cap by using to advantage the two positions in the use of the cap, namely its cap-on and cap-off positions, all as will be better understood as the description proceeds.

Figure 2:
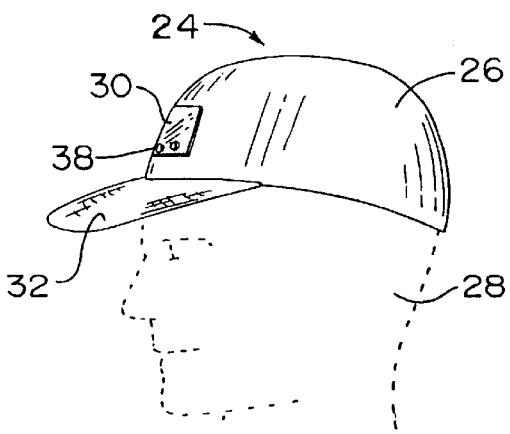
FIG. 2 is a cap-on side elevational view of a cap with a selected display object in accordance with the present invention.
Figure 3:
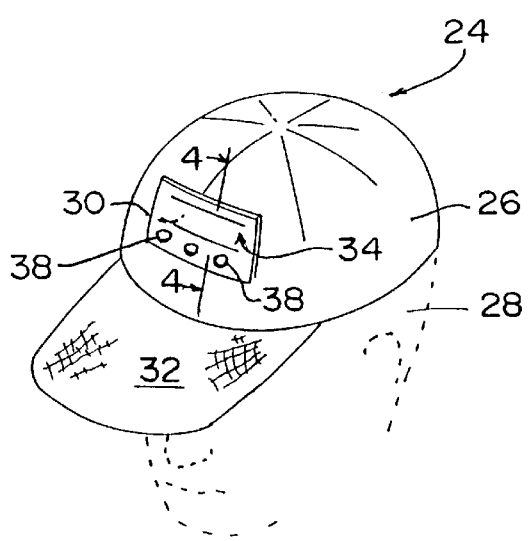
FIG. 3 is a perspective view projected from FIG. 2 showing further details of the display object.
Figure 4:
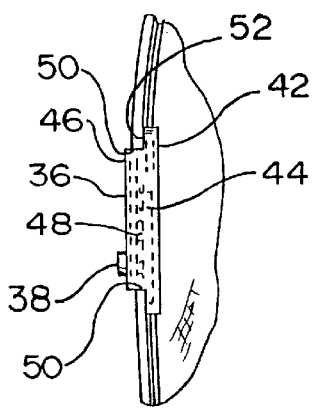
FIG. 4 is a cross sectional view taken along line 4—4 of FIG. 3.

As shown in FIGS. 2 and 3, the within inventive cap, generally designated 24, is in its cap-on position in which its head-covering body 26 is supported on a user's head 28, as shown in phantom perspective. It is to be understood that the object selected to be displayed in the display area 30 immediately above the beak 32 is preferably a video game, generally designated 34, having a display screen 36 and push buttons, individually and collectively designated 38, and a well understood operating mode in which operation of the button(s) 38 changes an image 40 (FIG. 5) on the display screen 36. U.S. Pat. No. 5,795,227 for "Electronic Game System" issued to Raviv et al. on Aug. 18, 1998 and U.S. Pat. No. 5,026,058 for "Electronic Baseball Game Apparatus" to Bromley on Jun. 25, 1991 exemplify appropriate video games to be used as video game 34.

It is to be noted however that the video game 34 in a general sense is push button-generated visual entertainment and thus should be understood to include visual production of anecdotes, the receiving of news reports, horoscope information of interest to the user, and the like, so long as the changing imagery is responsive to push button operation by the user.

In a preferred embodiment, video game 34 has a large sized rectangular base 42 housing a program of integrated circuitry 44 for operating the game thereof, an integral smaller sized extension 46 housing circuitry 48 for producing images 40 on its display screen 36 and buttons 38 which, when depressed, change the displayed images 40, said video game 34 being projected through an opening 50 appropriately sized and shaped in the cap body 26 and appropriately held in place, as by adhesive applied at the surface interface 52 of the contacting surfaces of the cap 24 and base 42.

Figure 5:
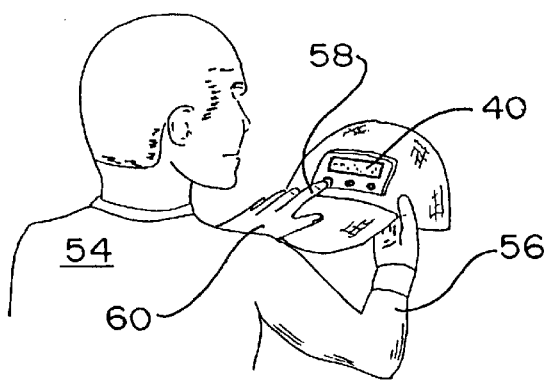
FIG. 5 is a cap-off perspective view of the cap of FIGS. 2–4.

In practice, it has been found that the cap-on position of cap 24 obviates loss of the video game 34 since it is more reliable than carrying the video game 34 in a pocket or otherwise on the person of the user. Additionally, as shown in FIG. 5, in the cap-off position, the user 54 can grip the cap 24 with one hand 56 and operate the push buttons 38 with a finger 58 of his other hand 60 and, since the display screen 36 is in facing relation to him, observe the changing images 40 on the display screen 36, all to the end of significantly adding to the play value of the cap 24.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A method of carrying a miniature battery-powered video game embodied with a display screen and depressible operational buttons adapted to produce images on said display screen incident to the button operation thereof, said method comprising the steps of:

A. Using a cap having a semi-circular body sized and shaped to assume a cap-on operative position in supported relation on a user's head and to assume a cap-off operative position when removed therefrom;

B. Using a miniature battery-powered video game having a display screen and an operational mode requiring depressing buttons incident to producing changing images on said display screen;

C. Mounting said video game in a display position on a front of said cap body;
D. Supporting said cap body and video game mounted thereon in a cap-on operative position during non-use of said video game; and
E. Preparatory to use of said video game changing said cap-on operative position to a cap-off position by manual removal thereof from said user's head, Whereby the cap-on position obviates inadvertent loss of said video game and the cap-off position is adapted to have said video game oriented in facing relation to a user to facilitate image-changing button operation thereof.

\* \* \* \* \*